(12) United States Patent
Pan et al.

(10) Patent No.: US 11,467,312 B2
(45) Date of Patent: Oct. 11, 2022

(54) DETERMINATION OF BOREHOLE CHARACTERISTICS USING ORIENTATION COMPONENTS OF AZIMUTHAL ELECTROMAGNETIC SIGNALS

(71) Applicant: Halliburton Energy Services, Inc., Houston, TX (US)

(72) Inventors: Li Pan, Singapore (SG); Hsu-Hsiang Wu, Sugar Land, TX (US); Yijing Fan, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/089,340

(22) Filed: Nov. 4, 2020

(65) Prior Publication Data
US 2022/0137251 A1 May 5, 2022

(51) Int. Cl.
*G01V 3/38* (2006.01)
*G01V 3/20* (2006.01)

(52) U.S. Cl.
CPC . *G01V 3/38* (2013.01); *G01V 3/20* (2013.01)

(58) Field of Classification Search
CPC .................................. G01V 3/38; G01V 3/20
See application file for complete search history.

(56) References Cited

U.S. PATENT DOCUMENTS

| | | | |
|---|---|---|---|
| 5,892,361 A | 4/1999 | Meyer et al. | |
| 2003/0137301 A1 | 7/2003 | Thompson et al. | |
| 2010/0082255 A1 | 4/2010 | Davydycheva et al. | |
| 2013/0073206 A1* | 3/2013 | Hou | G01V 3/30 702/7 |
| 2015/0338542 A1* | 11/2015 | Donderici | G01V 3/38 3/28 |
| 2016/0084983 A1 | 3/2016 | Wu et al. | |
| 2016/0109614 A1* | 4/2016 | Wu | G01V 3/38 3/38 |
| 2017/0285217 A1* | 10/2017 | Fang | G01V 3/38 3/20 |
| 2018/0100945 A1 | 4/2018 | Ewe et al. | |
| 2019/0094405 A1 | 3/2019 | Itskovich et al. | |
| 2021/0047921 A1* | 2/2021 | Bittar | E21B 49/00 3/30 |

* cited by examiner

*Primary Examiner* — Tarun Sinha
*Assistant Examiner* — Lal C Mang
(74) *Attorney, Agent, or Firm* — Benjamin Ford; Parker Justiss, P.C.

(57) ABSTRACT

The disclosure provides a method of determining one or more characteristics associated with a borehole, a computer program product that directs operations of a processor when executed to determine characteristics associated with a borehole, and a borehole characterizing system. In one example the method includes: (1) receiving azimuthal electromagnetic signals obtained in the borehole, wherein the azimuthal electromagnetic signals are transmitted at two operating frequencies in the borehole, (2) decoupling orientation components from the azimuthal electromagnetic signals of the two frequencies, (3) determining one or more borehole characteristics using one or more of the orientation components at the two operating frequencies, and (4) performing a borehole correction based on at least one of the one or more borehole characteristics.

21 Claims, 6 Drawing Sheets

DETERMINATION OF BOREHOLE CHARACTERISTICS USING ORIENTATION COMPONENTS OF AZIMUTHAL ELECTROMAGNETIC SIGNALS

TECHNICAL FIELD

This application is directed, in general, to characterizing a borehole, and, more specifically, to determining characteristics of a borehole using resistivity measurements.

BACKGROUND

In developing a hydrocarbon well system, operators can utilize information about a reservoir within a subterranean formation during drilling of a borehole. Logging-while-drilling (LWD) or measure-while-drilling (MWD) tools can be used when drilling the borehole to measure characteristics of the formation and of content, such as formation or drilling fluids, flowing through the formation. Sensors and other types of measurement tools can be used with drilling tools within the borehole to measure the various characteristics. A resistivity tool is one example, which transmits an electromagnetic signal into the formation and receives a formation response that can be used to determine the formation resistivity. A resistivity log can be created from the measurements and can be used to indicate hydrocarbon concentrations and other information useful to drillers and completion engineers. For example, azimuthally-sensitive logs can provide useful steering information to a driller by indicating when a target formation region has been entered or exited.

SUMMARY

In one aspect, the disclosure provides a method of determining one or more characteristics associated with a borehole. In one example the method includes: (1) receiving azimuthal electromagnetic signals obtained in the borehole, wherein the azimuthal electromagnetic signals are transmitted at two operating frequencies in the borehole, (2) decoupling orientation components from the azimuthal electromagnetic signals of the two frequencies, (3) determining one or more borehole characteristics using one or more of the orientation components at the two operating frequencies, and (4) performing a borehole correction based on at least one of the one or more borehole characteristics.

In another aspect, the disclosure provides a computer program product having a series of operating instructions stored on a non-transitory computer readable medium that direct operations of a processor when executed to determine characteristics associated with a borehole. In one example, the operations include: (1) determining orientation components from azimuthal electromagnetic signals obtained in the borehole, wherein the azimuthal electromagnetic signals are transmitted at two operating frequencies in the borehole, (2) selecting at least one of the orientation components, and (3) determining one or more borehole characteristics using the at least one of the orientation components.

In yet another aspect, the disclosure provides a borehole characterizing system. In one example, borehole characterizing system includes: (1) a memory configured to store orientation components from azimuthal electromagnetic signals obtained in a borehole, wherein the azimuthal electromagnetic signals are transmitted at two operating frequencies in the borehole, and (2) a processor configured to determine one or more borehole characteristic using one or more of the orientation components at the two operating frequencies.

BRIEF DESCRIPTION

Reference is now made to the following descriptions taken in conjunction with the accompanying drawings, in which.

DETAILED DESCRIPTION

Figure 1:
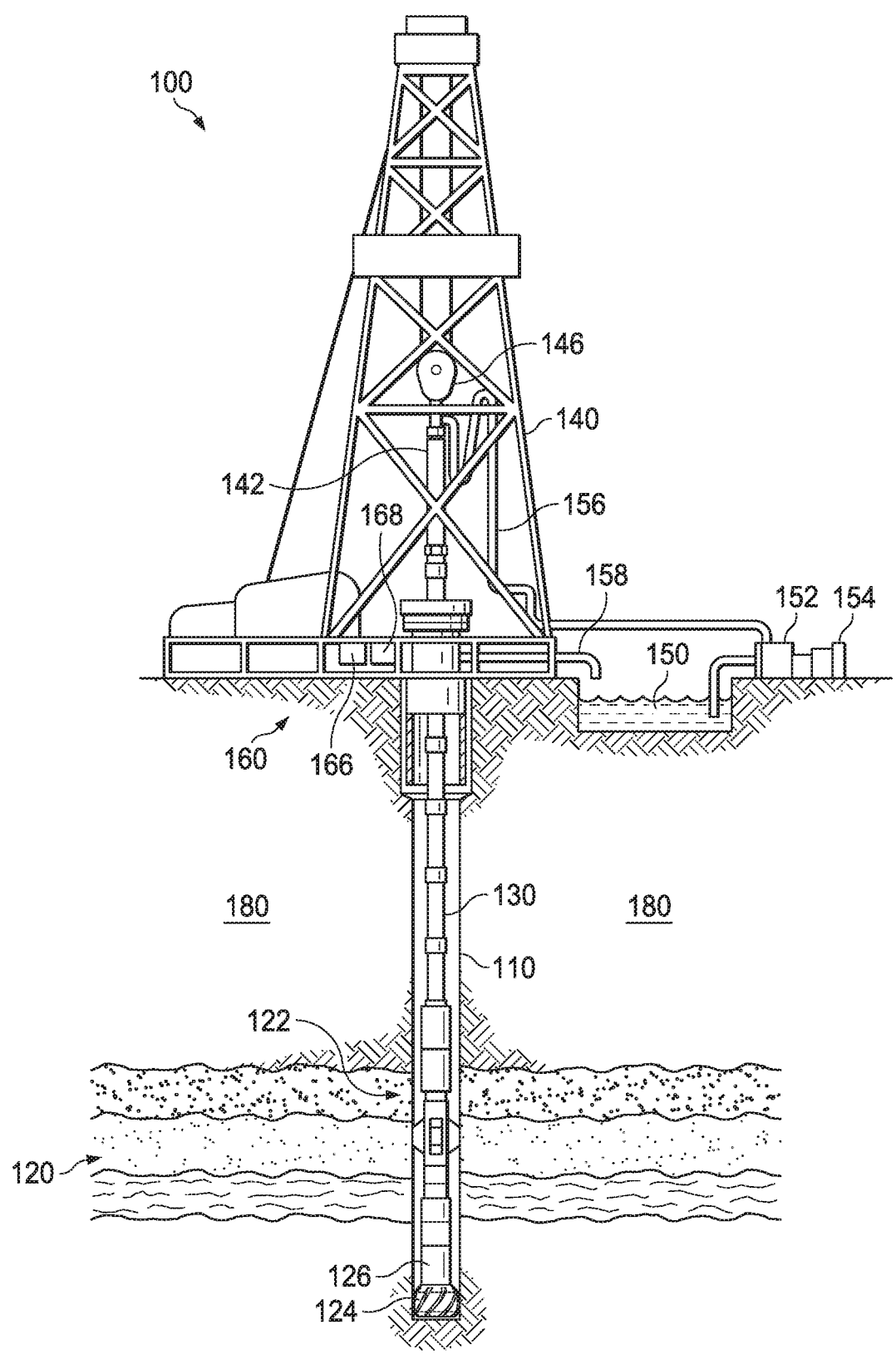
FIG. 1 is an illustration of a diagram of an example well system constructed according to the principles of the disclosure.

A resistivity tool is an example of a downhole tool having one or more transmitters that generate electromagnetic signals and one or more receivers that receive the electromagnetic signals after traversing the region in the vicinity of the borehole. As such, the received electromagnetic signals correspond to characteristics associated with a borehole, such as formation resistivity. The electromagnetic signals can be generated by a transmitter antenna orientated at one direction (x, y, or z or any direction among x and y and z), and then received at a receiver antenna orientated at another direction (again x, y, or z or any direction among x and y and z). The orientation direction of the receiver antenna can be different or can be the same as the transmitter antenna direction. Orientation components of the electromagnetic signals, referred to herein as azimuthal electromagnetic signals, correspond to the different orientation directions of the antennas for generating and receiving the azimuthal electromagnetic signals. The orientation components can be obtained via different processes and can depend on the transmitter-receiver configuration used to obtain the azimuthal electromagnetic signals. For example, the orientation components can be nine directional components that correspond to bin voltages measured from the azimuthal electromagnetic signals or multi-components decoupled from the bin voltages.

The disclosure provides a method for determining at least one characteristic of a borehole (i.e., borehole characteristic) using at least one particular orientation component of the azimuthal electromagnetic signals at two operating frequencies. The borehole characteristics can be, for example, one or more of formation resistivity, mud resistivity, or borehole size. Models, look-up tables, or a combination thereof, that have synthetic responses to orientation component inputs can be used for determining borehole characteristics. The synthetic responses can be synthetic parameters that correspond to desired borehole characteristics, such as formation resistivity, and are associated with synthetic components corresponding to the orientation components. Determining the one or more borehole characteristics can be based on an iterative inversion process, a look-up table process, or other mathematical calculation that adjusts one or more synthetic parameters such that the adjusted synthetic parameters will produce synthetic components matching with the one or more orientation components within a pre-defined threshold difference. The resulting synthetic parameters can be used for the desired borehole characteristics. The synthetic components can be calculated from a forward modeling or pre-calculated database based on the forward modeling.

In various examples, a resistivity tool having a single transmitter and collocated receivers can be used to obtain the azimuthal electromagnetic signals. With a resistivity tool having a single transmitter-receiver spacing, the length of tool configuration can be reduced compared to conventional tool designs that use multiple transmitter-receiver pairs. With overall shorter spacing and fewer antennas, the disclosure provides a procedure that can accurately determine formation resistivity and reduce the total tool length for look-ahead downhole tools by allowing antennas to be placed closer to the end of the tool. For example, the antenna sections in a bottom hole assembly (BHA) can be shorter allowing sensors behind the antenna section to be closer to the drilling bit and enhance the look-ahead ability in a borehole.

Figure 5:
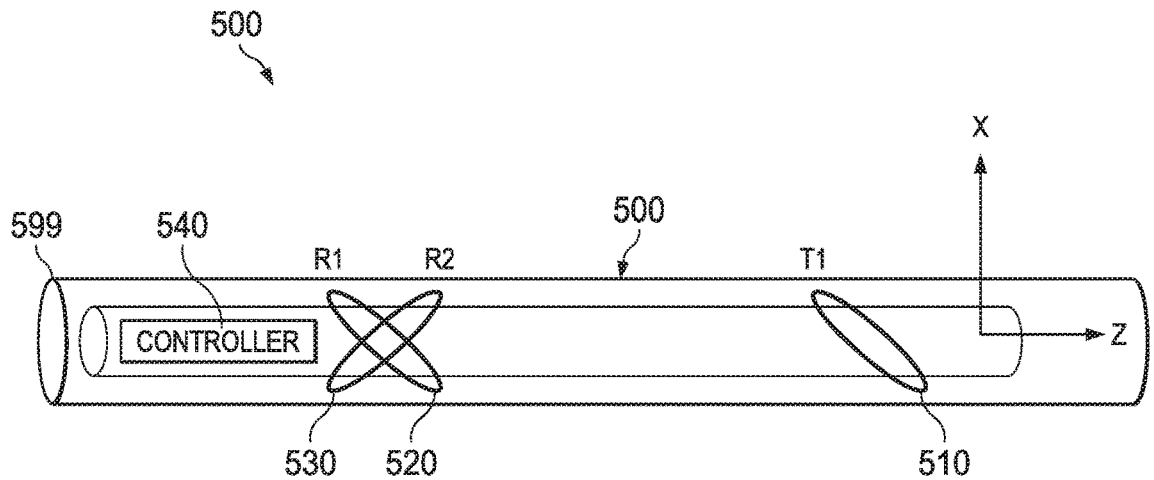
FIG. 5 is an illustration of a resistivity tool constructed according to the principles of the disclosure.

The azimuthal electromagnetic signals can be raw signals, such as voltage waveforms or signals, which are affected by borehole conditions. The orientation components of the azimuthal electromagnetic signals correspond to the x-axis, y-axis, and z-axis, such that different borehole effects can be exhibited along one or more axes as compared to borehole effects along the other axes. The disclosure recognizes that a particular orientation component, the zz component parallel to a borehole, can be used for determining formation resistivity. For example, the disclosure recognizes that the phase of a ratio of the zz component at two frequencies is insensitive to mud resistivity and increases monotonically with the increase of formation resistivity. Additionally, the disclosure recognizes that another orientation component can be useful for determining mud resistivity. For example, using a determined formation resistivity value, the phase of an orientation component that is perpendicular to the borehole, e.g., xx component, decreases monotonically with the increase of mud resistivity. FIG. 5 illustrates an example of a resistivity tool in a borehole with respect to x and z axes.

Turning now to the figures, FIG. 1 is an illustration of a diagram of an example well system 100 that can be, for example, a LWD system or a MWD system. The well system 100 can incorporate logging operations of a borehole 110 and surrounding subterranean formations 180 while drilling. Well system 100 is configured to drive a BHA 120 positioned or otherwise arranged at the bottom of a drill string 130 extended into subterranean formations 180 of the earth from derrick 140 arranged at the surface. Derrick 140 includes a kelly 142 and a traveling block 146 used to lower and raise the kelly 142 and drill string 130.

BHA 120 includes a tool string 122 and a drill bit 124 that is operatively coupled to the tool string 122. During operation, drill bit 124 penetrates the subterranean formations 180 and thereby creates borehole 110. BHA 120 provides directional control of drill bit 124 as it advances through the subterranean formations 180.

Fluid or "drilling mud" from a mud tank 150 may be pumped downhole using a mud pump 152 powered by an adjacent power source, such as a prime mover or motor 154. The drilling mud may be pumped from mud tank 150, through a stand pipe 156, which feeds the drilling mud into drill string 130 and conveys the same to the drill bit 124. The drilling mud exits one or more nozzles arranged in the drill bit 124 and in the process cools the drill bit 124. After exiting the drill bit 124, the mud circulates back to the surface via the annulus defined between the borehole 110 and the drill string 130, and in the process, returns drill cuttings and debris to the surface. The cuttings and mud mixture are passed through a flow line 158 and are processed such that a cleaned mud is returned down hole through the stand pipe 156 once again.

Tool string 122 can be semi-permanently mounted with various measurement tools such as, but not limited to, MWD and LWD tools, that may be configured to take downhole measurements of drilling conditions. For example, the tool string 122 can include a resistivity tool 126 that collects azimuthal electromagnetic signals as the drill bit 124 extends the borehole 110 through the subterranean formations 180.

The resistivity tool 126 is configured to generate and receive the azimuthal electromagnetic signals when in the borehole 110. The resistivity tool 126 can be, for example, a look-ahead shallow tool including sensors used to measure various downhole conditions, including azimuthal electromagnetic signals that can be used to determine mud resistivity, borehole size, and formation resistivity of the borehole 110. The resistivity tool 126 can be a very deep resistivity (VDR) tool. The resistivity tool 126 can operate at two frequencies and have different transmitter to receiver spacings for the two different frequencies. The resistivity tool 126 can also use the same transmitter-receiver spacing when operating at the two different frequencies. The resistivity tool 126 can include a single transmitter and a pair of receivers located a same distance from the transmitter (collocated) along a length of the resistivity tool 126, i.e., along the z axis. For example, the transmitter of the resistivity tool 126 can be activated and the collocated receivers can measure a response over a distance along the resistivity tool 126 through a portion of the subterranean formation 180 while rotating in the borehole 110. Resistivity tool 126 can also have another transmitter-receiver configuration, which can measure the azimuthal electromagnetic signals at a particular frequency. For example, a resistivity tool having three co-located transmitters and three co-located receivers can be used.

For purposes of communication, a downhole telemetry transceiver can be included in the BHA 120 and can transfer the azimuthal electromagnetic signals to the surface and receive commands from the surface, such as for directing operation of the resistivity tool 126. Mud pulse telemetry is one common telemetry technique for transferring tool measurements to surface receivers and receiving commands from the surface. Other telemetry techniques typically used in LWD or MWD systems can also be used.

At the surface, well controller equipment 160 can receive the azimuthal electromagnetic signals transmitted to the surface. Well controller equipment 160 includes one or more processors, storage mediums, input devices, output devices, software, and other computing components for operating the BHA 120 and drill string 130. For example, the well controller equipment 160 includes a drilling controller 166 that directs the drilling process of the borehole 110 by controlling drilling parameters of the drill bit 124. The drilling controller 166 can be a typical drilling controller that is used to control the drilling parameters of drill bits. Well controller equipment 160 also includes a borehole characterizing system 168 that can receive, store, and/or process the azimuthal electromagnetic signals to determine one or more borehole characteristic, for example, resistivity of at least a portion of the subterranean formation 180 and of the mud located in the borehole 110. Borehole site operators or engineers can use one or more of the determined formation and mud resistivities, including using an image representation thereof, and adjust the system operation plan or adjust drilling parameters based thereon. The borehole characterizing system 168 can be implemented on a computing device such as represented in FIG. 2.

The borehole characterizing system 168 can automatically provide one or more determined borehole characteristics to the drilling controller 166 that can then control the drill bit 124 based on the borehole characteristics. As such, borehole corrections can be made based on the determined borehole characteristics. Other borehole corrections in addition to controlling or adjusting the drill bit 124 can be made for directing operations at the borehole or for other well operations, such as well planning, fracking, etc. The borehole characterizing system 168 can also provide one or more of the determined borehole characteristics to a display for a human operator to use for controlling the drill bit 124 or adjusting other tool settings. The display can be part of the well controller equipment 160, such as the drilling controller.

FIG. 1 depicts an onshore drilling operation. The features disclosed herein can also be used in offshore operations. Additionally, the borehole 110 is a vertical borehole. The features disclosed herein can also be equally well suited for use in boreholes having other orientations including horizontal boreholes, slanted boreholes, multilateral boreholes, and other borehole types, such as a wireline well system, wherein the resistivity tool 126 can be lowered in the borehole 110 via a sonde.

Figure 2:
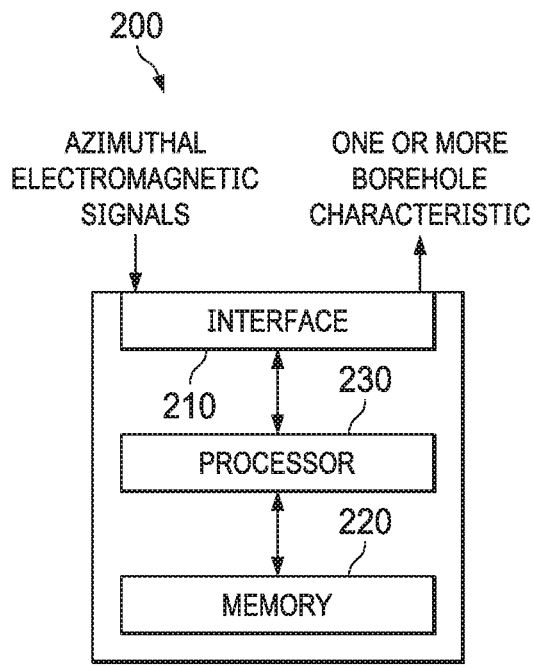
FIG. 2 is an illustration of a block diagram of an example of a borehole characterizing system constructed according to principles of the disclosure.

FIG. 2 illustrates a block diagram of an example of a borehole characterizing system 200 constructed according to principles of the disclosure. The borehole characterizing system 200 is configured to determine one or more borehole characteristics using at least one orientation component from azimuthal electromagnetic signals gathered from a borehole, such as borehole 110 of FIG. 1. The azimuthal electromagnetic signals can be received from a resistivity tool, such as resistivity tool 126 of FIG. 1. The resistivity tool can have a single transmitter and a pair of collocated receivers. The borehole characterizing system 200 can be implemented in one or more computing systems, for example, a well site controller, a reservoir controller, a data center, cloud environment, server, laptop, smartphone, tablet, and other computing systems. The computing system can be located a distance from the reservoir, such as in a data center, cloud environment, or corporate location, and communicate via a communications network. The computing system can also be located at or proximate the borehole. For example, the borehole characterizing system 200 can be located at the surface of a borehole, such as with the well controller equipment 160 of FIG. 1. As such, the borehole characterizing system 168 of FIG. 1 can be implemented as, or at least similarly to, the borehole characterizing system 200.

The borehole characterizing system 200, or at least a portion thereof, can be implemented as an application, a code library, dynamic link library, function, module, other software implementation, or combinations thereof. In some aspects, the borehole characterizing system 200 or a portion thereof can be implemented in hardware, such as a ROM, or other hardware implementation. The borehole characterizing system 200 can be implemented partially as a software application and partially as a hardware implementation. The borehole characterizing system 200 includes an interface 210, a memory 220, and a processor 230. Each of the components of the borehole characterizing system 200 can be communicatively coupled via conventional connections.

The interface 210 is configured to communicate, i.e., transmit and receive, data. As such, the interface 210 include the necessary circuitry, components, firmware, software, etc., to transmit and receive data. The interface 210 can be a conventional communications interface associated with processors or controllers that communicate data according to different protocols, such as industry protocols used for communicating data between equipment in the oil and gas industry. The interface 210 can be configured to communicate via a communications network when the borehole characterizing system 200, or a portion thereof, is remotely located from the borehole. The communications network can be a conventional communications network that communicates data according to standard protocols. The interface 210 receives azimuthal electromagnetic signals that have been gathered from a borehole.

The memory 220 is a non-transitory computer readable medium that is configured to store a series of operating instructions that direct the operation of the processor 230 when initiated, including code representing the algorithms for determining one or more borehole characteristics using at least one of the azimuthal electromagnetic signals. The memory 220 can also be configured to store additional data associated with the borehole, such as the azimuthal electromagnetic signals, borehole diameter, tool diameter, mud type, models associated with the borehole, etc. Additionally, the memory 220 can store pre-determined look-up tables for borehole characteristics, such as for formation and mud resistivities. The models and look-up tables can be created using simulation software before obtaining the azimuthal electromagnetic signals from the borehole and saved in the memory 220. A look-up table can be created for some sampling values, and during operation in the borehole, the processor 230 can generate an updated look-up table by interpolation. The processor 230 can use an iterative method that builds look-up tables. For example, a look-up table for formation resistivity can be constructed using a zz component at two frequencies, which is less sensitive to mud resistivity than other orientation components. For the mud, a look-up table can be constructed using an orientation component that is perpendicular to the borehole, such as an xx component.

The processor 230 is configured, i.e., designed and constructed, to determine the borehole characteristics using one or more orientation components of azimuthal electromagnetic signals. The processor 230 can operate according to methods 300, 400, or 470 as disclosed herein to determine one or more borehole characteristics. An algorithm or algorithms corresponding to these methods can be stored on the memory 220. The processor 230 can determine, for example, the mud resistivity and the formation resistivity based on an inversion process using an orientation component from bin voltages measured at a single transmission-receiver spacing. The processor 230 can use a pre-determined threshold value to determine when convergence has occurred between current and previous iterations when determining the borehole characteristics. A convergence criteria used to compare to the threshold value can be the absolute difference between the current and previous iterations of a first borehole characteristic over a second borehole characteristic. The determined borehole characteristics can be employed by a well site controller for directing operations at the borehole, such as steering a drill bit, or for other well operations, such as well planning, fracking, etc.

Figure 3:
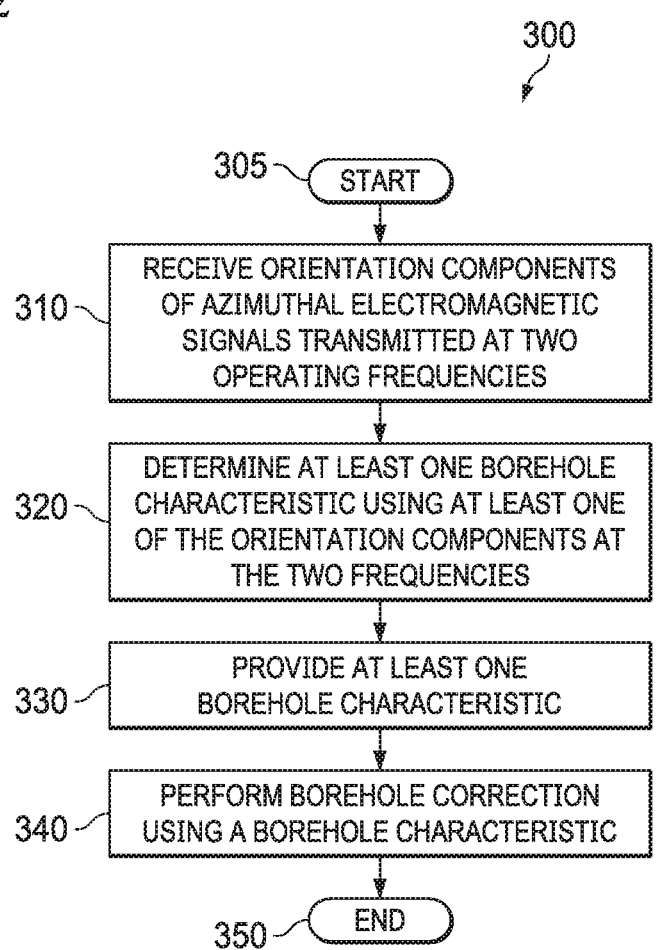
FIG. 3 is an illustration of a flow diagram of an example of a method for determining characteristics of a borehole carried out according to the principles of the disclosure.

FIG. 3 illustrates a flow diagram of an example of a method 300 for determining borehole characteristics carried out according to the principles of the disclosure. A portion of the method 300 can be carried out by a borehole characterizing system, such as the borehole characterizing system 200 of FIG. 2. The method 300 begins in a step 305.

In a step 310, orientation components of azimuthal electromagnetic signals are received. The azimuthal electromagnetic signals are transmitted and received in a borehole and the orientation components can be received by a borehole characterizing system. The orientation components can be determined by various processes. For example, the orientation components can be decoupled from the azimuthal electromagnetic signals. The azimuthal electronic signals can be obtained from a resistivity tool and stored as bin voltages. A resistivity tool having three transmitters and three receivers can be used to obtain the azimuthal electromagnetic signals. Additionally, a resistivity tool that rotates within the borehole and transmits the azimuthal electromagnetic signals at two operating frequencies can be used. A resistivity tool having a single transmitter and a pair of co-located receivers, such as resistivity tool 500, is an example of a resistivity tool that can be used to obtain the azimuthal electromagnetic signals. From the gathered azimuthal electromagnetic signals, the orientation components can be decoupled. The borehole characterizing system 200 can also be configured to perform the decoupling. Different decoupling processes can be used. The discussion with respect to step 440 of method 400 provides an example of decoupling.

The orientation components can also be more directly obtained from the azimuthal electromagnetic signals. Bin voltages of the azimuthal electromagnetic signals at the two frequencies that already reflect transmitter-receiver orientations can be used as the orientation components. As such, no decoupling is needed.

In step 320, at least one characteristic of the borehole is determined using at least one of the orientation components at two operating frequencies. More than one borehole characteristic can be determined using different ones of the orientation components. Determining the one or more borehole characteristics can employ one or more models in an inversion process with iterations. One or more orientation components can be provided as an input for comparison to values of synthetic components of the models. When a determined threshold is satisfied based on the comparison, a synthetic parameter or parameters associated with the synthetic component can be provided as the one or more borehole characteristic. In addition to an iterative process, a model or models can be used in a look-up process for determining the borehole characteristics.

Various types of fixed and adjustable models can be used for step 320 and usage can be based on the orientation component that is used as an input. An example of a fixed model is a tool model, such as a resistivity tool, that includes the parameters of the tool. The parameters can include physical dimensions, such as a diameter and transmitter-receiver spacing, and operating data, such as operating frequencies. The adjustable models can include, for example, a formation model, a formation resistivity model, and a mud resistivity model. The synthetic parameters of the models that correspond to borehole characteristics can be adjusted during an inversion process.

The at least one borehole characteristic is provided in step 330 as an output. The borehole characteristic can be, for example, a mud resistivity, a formation resistivity, or a borehole size. The one or more borehole characteristic can be used for borehole corrections in step 340. The borehole corrections can include updating models, changing well operations, changing well planning, etc. After step 340, the method 300 continues to step 350 and ends.

Figure 4A:
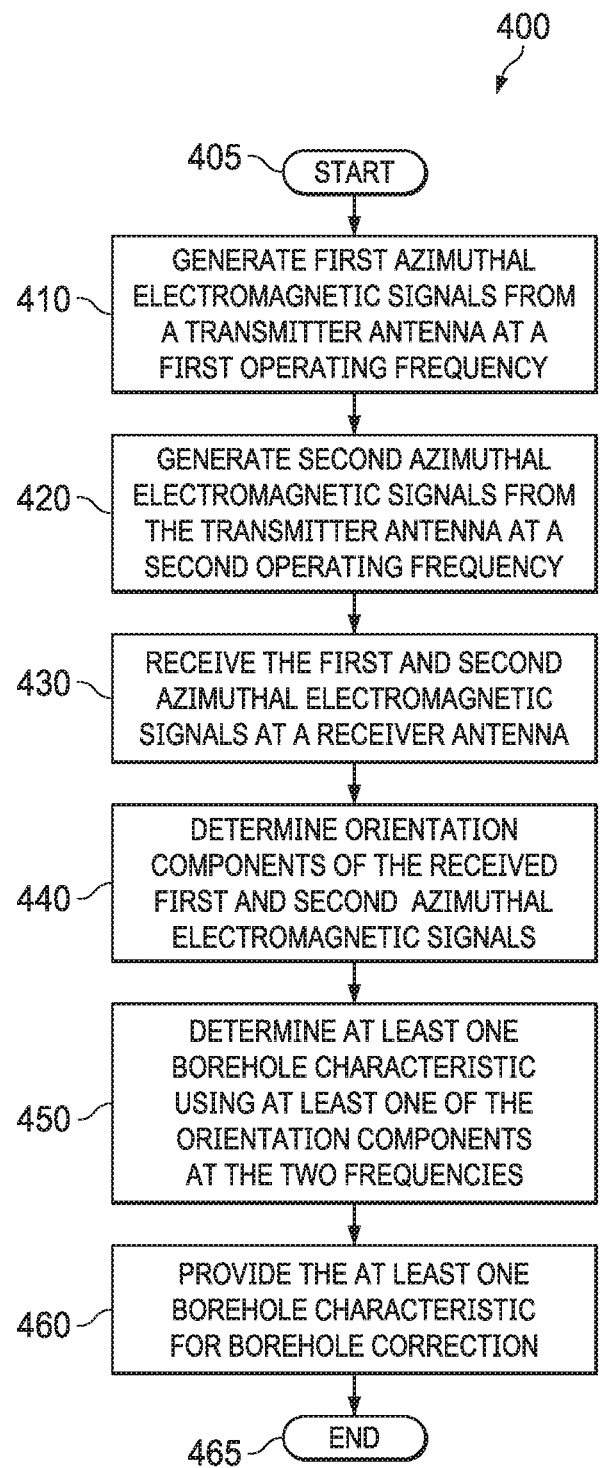
FIG. 4A is an illustration of a flow diagram of another example of a method for determining characteristics of a borehole carried out according to the principles of the disclosure.

FIG. 4A illustrates a flow diagram of another example of a method 400 of determining one or more borehole characteristics according to the principles of the disclosure. The method 400 includes obtaining azimuthal electromagnetic signals at two frequencies. A first set of azimuthal measurements can be obtained from a first transmitter-receiver spacing at a first frequency and a second set of azimuthal measurements can be obtained from a second transmitter-receiver spacing at a second frequency that is different than the first frequency. The azimuthal electromagnetic signals can also be obtained at two different frequencies and the same transmitter-receiver spacing. The resistivity tool of FIG. 5 provides an example of a resistivity tool having a transmitter-receiver antenna configuration of a single transmitter and collocated receivers that can be used for transmitting and receiving electromagnetic signals in a borehole according to at least some of the steps of method 400. The method 400 begins at step 405.

In step 410, first azimuthal electromagnetic signals are generated from a transmitter at a first operating frequency. In step 420, second azimuthal electromagnetic signals are generated from the transmitter at a second operating frequency. As such, the same transmitter can generate both the first and second azimuthal electromagnetic signals at different operating frequencies. A controller of the resistivity tool can be used to change the frequencies of the transmitter.

In step 430, the first and second azimuthal electromagnetic signals are received at a receiver. The azimuthal electromagnetic signals are measured at the two frequencies and the same transmitter-receiver spacing. A circumference around the resistivity tool can be divided into bins and the azimuthal electromagnetic signals can be measured for each of the bins. The number of bins, for example, can be 32. The received first and second azimuthal electromagnetic signals can be stored in a database or memory of the borehole characterizing system as, for example, bin voltages.

The azimuthal electromagnetic signals correspond to the x-axis, y-axis, and z-axis, such that different borehole effects can be exhibited along one or more axes as compared to borehole effects along the other axes. For example, FIG. 5 depicts a resistivity tool 500 constructed according to the principles of the disclosure that illustrates the different axes. The resistivity tool 500 includes a transmitter 510 and collocated receivers 520, 530, and is shown in a portion of a borehole 599. Though shown in a horizontal position, the resistivity tool 500 can be, for example, the resistivity tool 126 positioned in borehole 110 of FIG. 1. The transmitter 510 can be tilted and at least one of the receivers 520, 530, can be titled with respect to the transmitter 510. The opposing tilting configuration of the receivers 520, 530, can be used to measure the generated azimuthal electromagnetic signals within a three-dimensional domain. The resistivity tool 500 can rotate within the borehole 599 to create the measurements in different orientations. Controller 540 can direct transmission of the electromagnetic signals at the first and second operating frequencies. The transmitter 510 may be referred to as T1 and the receivers 520, 530, may be referred to as R1, R2. The x axis and the z axis with respect to the resistivity tool 500 and the borehole 599 are denoted in FIG. 5. Measurements corresponding to the x axis are more sensitive to mud resistivity and measurements along the z axis are more sensitive to formation resistivity.

Returning to FIG. 4A, in step 440 orientation components of the received first and second azimuthal electromagnetic signals are determined. For example, the bin voltages at both frequencies can be used as the orientation components. The bin voltages can also be decoupled into multi-components and used as the orientation components. A processor, such as part of a borehole characterizing system, can be configured to perform step 440. The processor can be located downhole or at the surface. If at the surface, a telemetry system, such as typically used in LWD, MWD, or wireline systems, can be used to transmit the received azimuthal electromagnetic signals up-hole.

As noted above, the azimuthal electromagnetic signals can be generated by a transmitter antenna orientated at one direction (x, y, or z or any direction among x and y and z), and then received at a receiver antenna orientated, or tilted, at another direction (again x, y, or z or any direction among x and y and z). As an example of decoupling, the azimuthal electromagnetic signals can be measured by a tilted receiver in response to the firing of a tilted transmitter and can be expressed in terms of the signals $V_{IJ}$, wherein I represents the transmitter and J represents the receiver. The transmitter T1 and the receivers R1, R2, of the resistivity tool 500 can be used for the below decoupling example. When both transmitter and receiver coils are oriented at the same azimuth angle $\beta$, the tilted receiver signal $V_R$ is $$V_R(\beta) = \begin{bmatrix} \sin\theta_T\cos\beta \\ \sin\theta_T\sin\beta \\ \cos\theta_T \end{bmatrix}^T \begin{bmatrix} V_{xx} & V_{yx} & V_{zx} \\ V_{xy} & V_{yy} & V_{zy} \\ V_{xz} & V_{yz} & V_{zz} \end{bmatrix} \begin{bmatrix} \sin\theta_R\cos\beta \\ \sin\theta_R\sin\beta \\ \cos\theta_R \end{bmatrix} \quad (1)$$

where $\theta_T$ is the tilt angle of the transmitter and $\theta_R$ is the tilt angle of the receiver. In written-out form, the received azimuthal electromagnetic signal is:

$$V_R(\beta) = \left[\left(\frac{C_{xx}}{2} - \frac{C_{yy}}{2}\right)\cos 2\beta + \left(\frac{C_{yx}+C_{xy}}{2}\right)\sin 2\beta\right] + \quad (2)$$
$$[(C_{zx}+C_{xz})\cos\beta + (C_{zy}+C_{yz})\sin\beta] + \left(C_{zz} + \frac{C_{xx}}{2} + \frac{C_{yy}}{2}\right) =$$
$$V_{double}(\beta) + V_{single}(\beta) + V_{const}$$

meaning that $$\begin{cases} V_{double}(\beta) = \left(\frac{C_{xx}}{2} - \frac{C_{yy}}{2}\right)\cos 2\beta + \left(\frac{C_{yx}+C_{xy}}{2}\right)\sin 2\beta \\ V_{single}(\beta) = (C_{zx}+C_{xz})\cos\beta + (C_{zy}+C_{yz})\sin\beta \\ V_{const} = C_{zz} + \frac{C_{xx}}{2} + \frac{C_{yy}}{2} \end{cases} \quad (3)$$

where the coupling matrix C is $$\begin{cases} C_{xx} = V_{xx}\sin\theta_t\sin\theta_r; & C_{yx} = V_{yx}\sin\theta_t\sin\theta_r; & C_{zx} = V_{zx}\cos\theta_t\sin\theta_r; \\ C_{xy} = V_{xy}\sin\theta_t\sin\theta_r; & C_{yy} = V_{yy}\sin\theta_t\sin\theta_r; & C_{zy} = V_{zy}\cos\theta_t\sin\theta_r \\ C_{xz} = V_{xz}\sin\theta_t\cos\theta_r; & C_{yz} = V_{yz}\sin\theta_t\cos\theta_r; & C_{zz} = V_{zz}\cos\theta_t\cos\theta_r \end{cases} \quad (4)$$

Sinusoidal curve fitting may be applied to the received azimuthal electromagnetic signal to extract the (summed) coefficients in equation (3). The measurements of a second tilted receiver's response to the tilted transmitter provides an additional set of measurements that enables the individual $C_{IJ}$ (or equivalently, the $V_{IJ}$) values to be obtained. (Note that in most cases $V_{xy}$, may be assumed equal to $V_{yx}$, but the same is not true for the other cross components.) As an example, take $\theta_t = \theta_{r2} = \theta_c$ and $\theta_{r1} = \theta_{r2}$, with the receivers R1 and R2 collocated at a distance $d_1$ from the transmitter T1. The zz coupling component can be written as $$V_{zz}(d_1) = \frac{V_{r1\_const} + V_{r2\_const}}{2\cos^2\theta_c} \quad (5a)$$

where $V_{r1\_const}$ is the constant complex voltage $V_{const}$ from equation (2) associated with receiver R1, and $V_{r2\_const}$ is the corresponding value for receiver R2. Along similar lines, the xx and yy components can be written $$V_{xx}(d_1) = \frac{(V_{r1\_const} - V_{r2\_const}) + (V_{r1\_double\_cos} - V_{r2\_double\_cos})}{2\sin^2\theta_c} \quad (5b)$$

$$V_{yy}(d_1) = \frac{(V_{r1\_const} - V_{r2\_const}) - (V_{r1\_double\_cos} - V_{r2\_double\_cos})}{2\sin^2\theta_c} \quad (5c)$$

The cross components can be written:

$$V_{xy}(d_1) = V_{yx}(d_1) = \frac{V_{r1\_double\_sin} - V_{r2\_double\_sin}}{2\sin^2\theta_c} \quad (6a)$$

$$V_{yz}(d_1) = \frac{V_{r1\_single\_sin} + V_{r2\_single\_sin}}{2\cos\theta_c\sin\theta_c} \quad (6b)$$

$$V_{zy}(d_1) = \frac{V_{r1\_single\_sin} - V_{r2\_single\_sin}}{2\cos\theta_c\sin\theta_c} \quad (6c)$$

$$V_{xz}(d_1) = \frac{V_{r1\_single\_cos} + V_{r2\_single\_cos}}{2\cos\theta_c\sin\theta_c} \quad (6d)$$

$$V_{zx}(d_1) = \frac{V_{r1\_single\_cos} + V_{r2\_single\_cos}}{2\cos\theta_c\sin\theta_c} \quad (6e)$$

Other techniques for deriving the coupling components from the received azimuthal electromagnetic signal measurements are known and may be used. See, e.g., WO 2008/076130 "Antenna coupling component measurement tool having a rotating antenna configuration" and WO 2011/129828 "Processing and Geosteering with a Rotating Tool". Regardless the technique, the decoupling is performed for the received azimuthal electromagnetic signals at both frequencies.

After obtaining the multiple orientation components, the components can be calibrated for further processing. The multiple directional components can be calibrated, for example, by air-hang calibration. An "air hang" test is often performed before a resistivity tool is used in a drilling system. The test provides a baseline offset between the receivers when the receivers operate at room temperature. Using the resistivity tool 500 as an example, the transmitter 510 can be fired in an air-hang test and the signals are then received by the receiver pair 520, 530. An attenuation offset and a phase offset of the receivers 520, 530, can be determined. The attenuation offset and phase offset can be stored for calibration, such as in the memory 220 of the borehole characterizing system 200.

In a step 450, at least one borehole characteristic is determined using at least one of the orientation components at the two frequencies. Determining the borehole characteristic can be based on various mathematical processes, such as an iterative inversion process or a look-up table process. Another type of mathematical process that adjusts synthetic parameters of models such that the adjusted parameters will produce synthetic components matching with the selected orientation components within a pre-defined threshold difference can be used. The synthetic parameters can be calculated from a forward modeling or pre-calculated database based on the forward modeling. The forward modeling can be based on, for example, observed values for the different resistivities and the azimuthal electromagnetic signal measurements that are responsive to the resistivities.

Different type of orientation components can be selected for the determining process. For example, bin voltages for the different frequencies or decoupled multi-components can be used. The type of orientation component selected as an input for the determining process can determine the type of synthetic component used for comparing and adjusting. Additionally, determining one or more borehole characteristic can be performed using one or more of the orientation components via different processes. Using multi-components for example, the formation resistivity and the mud resistivity can be determined together using both $V^{xx}$ at one frequency and $V^{zz}$ from the two frequencies. The formation resistivity can also be determined first using $V^{zz}$ from the two frequencies, and then determine the mud resistivity using the known formation resistivity and $V^{xx}$ at one of the two frequencies. For an initial iteration, the mud resistivity can be set to a fixed value, such as zero, for determining the formation resistivity. The $V^{zz}$ orientation component at the two frequencies can be used to determine the formation resistivity and then determine the mud resistivity based on $V^{xx}$ multi-component measurement at one of the two frequencies.

Figure 6:
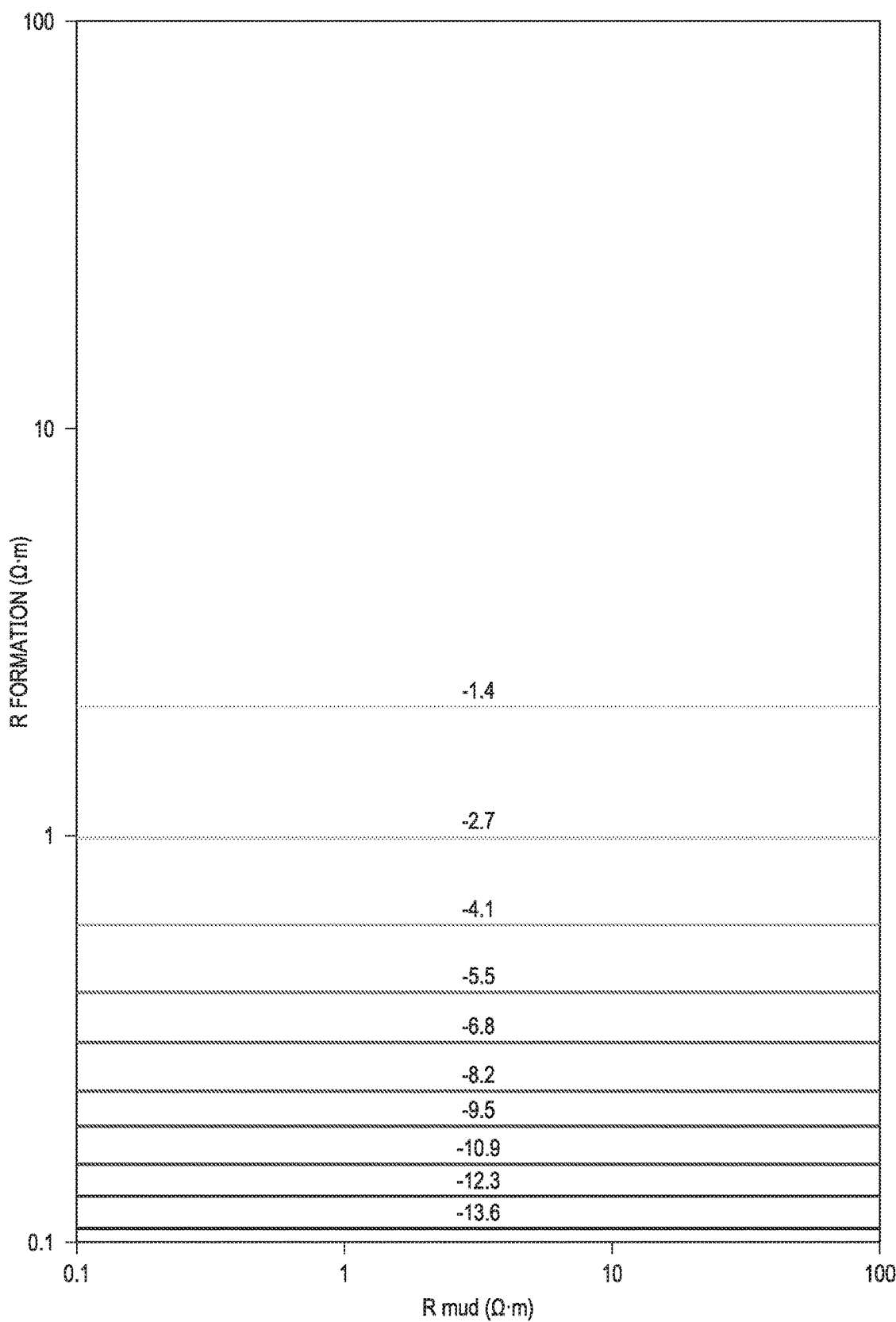
FIG. 6 is an illustration of graphical representations of an example of formation resistivity versus mud resistivity in a borehole created according to the principles of the disclosure.
Figure 7:
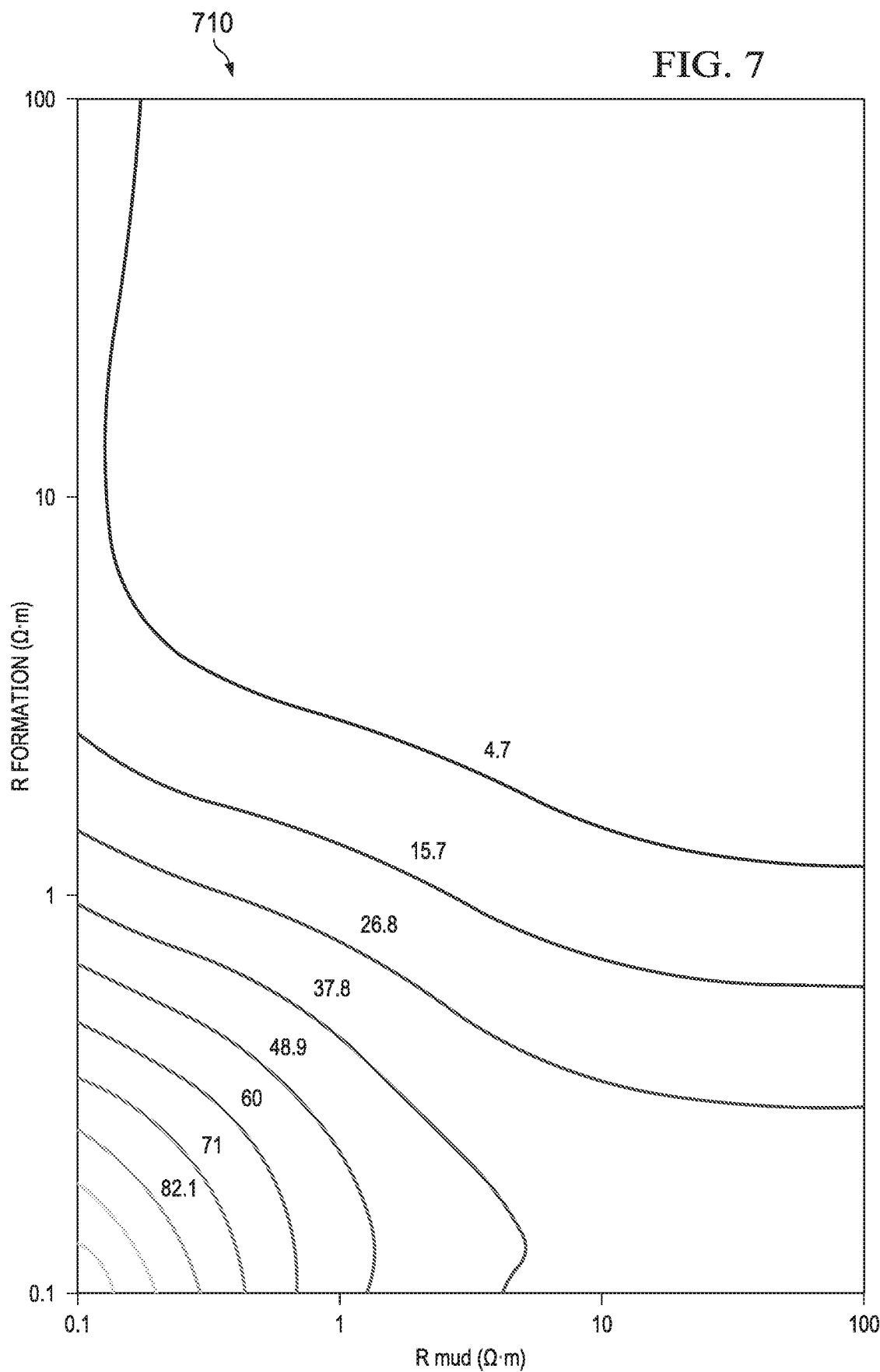
FIG. 7 is an illustration of other graphical representations of an example of formation resistivity versus mud resistivity in a borehole created according to the principles of the disclosure.

Advantageously, the disclosure recognizes that the phase of a ratio of $V^{zz}$ components at two frequencies is insensitive to mud resistivity and increases monotonically with the increase of formation resistivity. FIG. 6 provides a visual example. Additionally, the disclosure recognizes that fixing the value of formation resistivity, the phase of the $V^{xx}$ component decreases monotonically with the increase of mud resistivity. FIG. 7 provides a visual example. Using these realizations, the look-up tables can be iteratively constructed.

After a borehole characteristic is determined, the method 400 provides the borehole characteristic for borehole correction in step 460. The method then end in step 465.

Figure 4B:
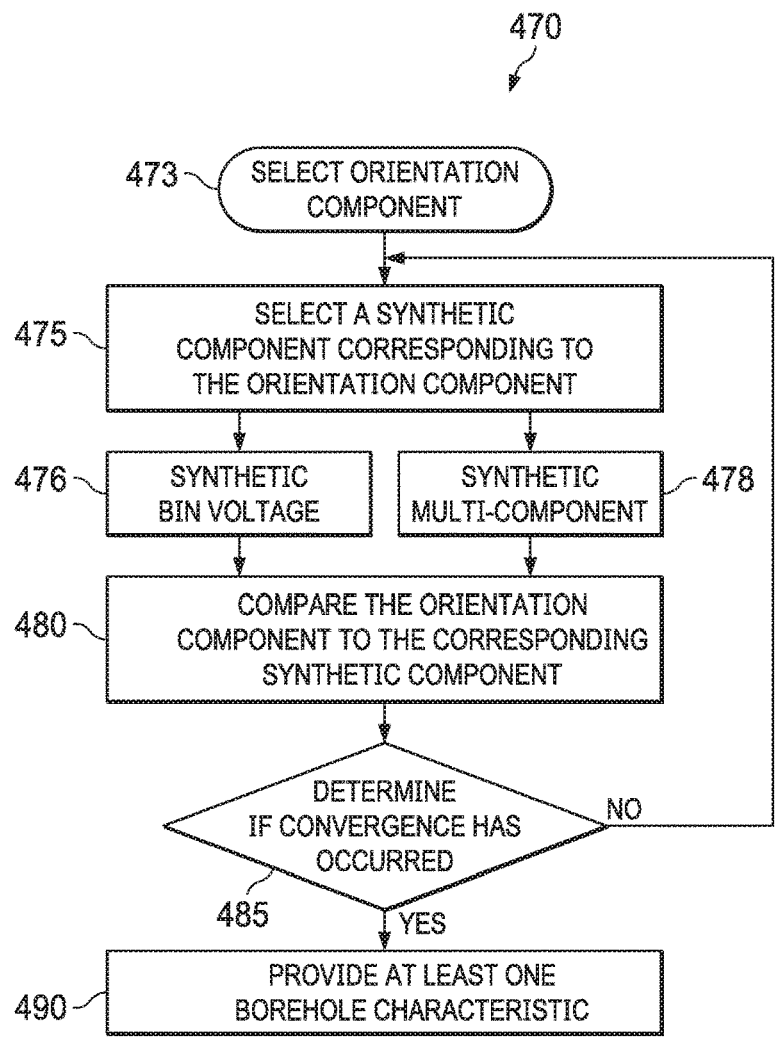
FIG. 4B is an illustration of a flow diagram of an example of a method for determining borehole characteristics using orientation components according to the principles of the disclosure.

FIG. 4B illustrates a flow diagram of an example of a method 470 using the different type of orientation components for determining borehole characteristics. The method 470 can be part of step 450 of method 400.

The method 470 begins with selecting at least one orientation component as an input in step 473. The orientation component can be a bin voltage or can be a de-coupled multi-component.

In step 475, a corresponding synthetic component is selected from a model associated with the borehole. The models correspond to the borehole and include synthetic components that correspond to parameter values of the borehole. For example, a model can be a formation resistivity model that includes various formation resistivities (i.e., synthetic resistivities, which is an example of a synthetic parameter) and synthetic components that correspond to the different synthetic resistivities. If the orientation component is a bin voltage, a synthetic bin voltage is selected from at least one model as represented by step 476. If the orientation component is a multi-component, a synthetic multi-component is selected from at least one model as represented by step 478.

In step 480, a comparison between the orientation component and the corresponding synthetic component is made. For example, a synthetic bin voltage of step 476 can be compared to the bin voltage used as the orientation component. Similarly, a synthetic multi-component of step 478 can be compared to the multi-component used as the orientation component. As noted above, more than one orientation component can be used for the comparison.

A determination is then made in step 485 if convergence has occurred. Convergence can be determined by comparing the absolute difference between the orientation component and the synthetic component to a threshold value. The threshold value can be predetermined and can vary depending on the orientation component or components used for the determining.

If convergence has occurred, at least one borehole characteristic can be provided as an output in step 490. The synthetic parameter corresponding to the last synthetic component can be used for the borehole characteristic. More than one borehole characteristic can be provided as an output. For example, the synthetic parameters for formation resistivity, mud resistivity, and borehole size can be selected from one or more models using the synthetic component of the last iteration that satisfied the threshold. Step 490 can provide the result for step 450 of method 400.

When the convergence criteria is not satisfied, e.g., a pre-determined threshold is not met, then the method 470 continues to step 475 and another synthetic component is selected. Various criteria can be used to select a different synthetic component. For example, the result of the comparison in step 480 can be a basis for selecting the next synthetic component. Other numerical calculations can be used for selecting the next synthetic component, including known numerical calculations used in inversion processes. Numerical calculations can also be used adjust the synthetic parameters in the table. The numerical calculations for adjusting can also be known calculations or procedures used in the industry. The synthetic parameters of more than one of the models can be adjusted. The method 470 then continues until convergence at step 485, and thereafter step 490.

FIG. 6 illustrates graphical representations of an example of formation resistivity versus mud resistivity in a borehole. The graphical representations demonstrate that the phase of a ratio of the received azimuthal electromagnetic signals of the z component at two frequencies ($V^{zz}f_1/V^{zz}f_2$) is insensitive to mud resistivity and increases monotonically with the increase of formation resistivity. Graph 610 illustrates a contour map, wherein the contours illustrate the different phases of $V^{zz}f_1/V^{zz}f_2$, wherein $V^{zz}f_1$ is the ZZ component of frequency $f_1$ and $V^{zz}f_2$ is the ZZ component of frequency $f_2$.

FIG. 7 illustrates other graphical representations of an example of formation resistivity versus mud resistivity in a borehole. The graphical representations in FIG. 7 demonstrate that when the value of formation resistivity is fixed, the phase of the x component of the received azimuthal electromagnetic signals ($V^{xx}f_1$) decreases monotonically with the increase of mud resistivity. Graph 710 illustrates a contour map, wherein the contours illustrate the different phases of $V^{xx}f_1$, which is the XX component at frequency $f_1$. While methods disclosed herein can provide a numerical solution for determining borehole characteristics, such as the formation resistivity (RF) and the mud resistivity (RM,) the graphs of FIGS. 6-7 can provide a graphical solution. For example, placing Graph 610 over Graph 710, a solution to RF and RM is where a contour of Graph 610 intersects with a contour of Graph 710.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a FPGA, or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method of determining one or more characteristics associated with a borehole, comprising:
   receiving azimuthal electromagnetic signals obtained in the borehole using at least two receivers spaced at a same transmitter-receiver spacing, wherein the azimuthal electromagnetic signals are transmitted at two operating frequencies in the borehole;
   decoupling orientation components from the azimuthal electromagnetic signals of the two operating frequencies;
   determining one or more borehole characteristics using one or more of the orientation components at the two operating frequencies based on a ratio of the one or more orientation components at the two operating frequencies;
   determining a borehole correction based on at least one of the one or more borehole characteristics;
   accurately determining a formation resistivity surrounding a tool in the wellbore from the borehole characteristics; and
   steering a drill bit based on the determined formation resistivity by indicating when a target formation region has been entered or exited.

2. The method as recited in claim 1, wherein the determining includes adjusting one or more synthetic parameters until the adjusted one or more synthetic parameters produce synthetic components that match the one or more orientation components within a pre-defined threshold difference.

3. The method as recited in claim 2, wherein the determining is based on an iterative inversion process or a look-up table process.

4. The method as recited in claim 3, wherein the one or more synthetic parameter is provided as an output for the one or more borehole characteristic when the iterative process or look-up table searching converges.

5. The method as recited in claim 2, where the synthetic components are calculated from a forward modeling or pre-calculated database based on the forward modeling.

6. The method as recited in claim 1, wherein the one or more borehole characteristic includes formation resistivity, mud resistivity, or borehole size.

7. The method as recited in claim 6, wherein the one or more of the orientation components is a decoupled $V^{zz}$ multi-component and the determining the formation resistivity is based on the $V^{zz}$ multi-component at the two operating frequencies, wherein the $V^{zz}$ multi-component is insensitive to a presence of the mud resistivity in the borehole.

8. The method as recited in claim 7, wherein the determining the mud resistivity in is based on a decoupled $V^{xx}$ multi-component at one of the two frequencies and the determined formation resistivity, wherein the $V^{xx}$ multi-component is sensitive to both a presence of the formation resistivity and the mud resistivity.

9. The method as recited in claim 1, further comprising:
   generating first azimuthal electromagnetic signals from a transmitter in the borehole at a first operating frequency,
   generating second azimuthal electromagnetic signals from the transmitter at a second operating frequency, and receiving the first and the second azimuthal electromagnetic signals at a receiver in the borehole, wherein the first and second operating frequencies are the two operating frequencies.

10. The method as recited in claim 9, further comprising storing the azimuthal electromagnetic signals as bin voltages.

11. The method as recited in claim 10, wherein the orientation components are decoupled multi-components from the bin voltages.

12. The method as recited in claim 1, wherein a transmitter to receiver spacing for obtaining the azimuthal electromagnetic signals at a first one of the two operating frequencies is different than a transmitter to receiver spacing for obtaining the azimuthal electromagnetic signals at a second one of the two operating frequencies.

13. A computer program product having a series of operating instructions stored on a non-transitory computer readable medium that direct operations of a processor when executed to determine characteristics associated with a borehole, the operations comprising:
    determining orientation components from azimuthal electromagnetic signals obtained in the borehole using at least two receivers at a same transmitter-receiver spacing, wherein the azimuthal electromagnetic signals are transmitted at two operating frequencies in the borehole;
    selecting at least one of the orientation components;
    determining one or more borehole characteristics using the at least one of the orientation components at the two operating frequencies based on a ratio of the one or more orientation components at the two operating frequencies;
    determining a borehole correction based on at least one of the one or more borehole characteristics;
    accurately determining a formation resistivity surrounding a tool in the wellbore from the borehole characteristics; and
    steering a drill bit based on the determined formation resistivity by indicating when a target formation region has been entered or exited.

14. The computer program product as recited in claim 13, wherein the determining includes using the at least one of the orientation components at the two operating frequencies.

15. The computer program product as recited in claim 13, wherein the one more borehole characteristic includes formation resistivity, mud resistivity, and borehole size.

16. The computer program product as recited in claim 13, wherein the determining is based on an iterative inversion process using the at least one of the orientation components as an input.

17. The computer program product as recited in claim 13, wherein the azimuthal electromagnetic signals represented by bin voltages and the orientation components are decoupled multi-components from the bin voltages.

18. The computer program product as recited in claim 17, wherein the one or more borehole characteristics includes a formation resistivity and a mud resistivity, and the determining includes determining the formation resistivity and the mud resistivity together using $V^{xx}$ at one of the two operating frequencies and $V^{zz}$ from both of the two operating frequencies as the at least one orientation component.

19. A borehole characterizing system, comprising:
    a memory configured to store orientation components from azimuthal electromagnetic signals obtained in a borehole using at least two receivers at a same transmitter-receiver spacing, wherein the azimuthal electromagnetic signals are transmitted at two operating frequencies in the borehole; and
    a processor configured to:
        determine one or more borehole characteristic using one or more of the orientation components at the two operating frequencies based on a ratio of one or more orientation components at the two operating frequencies;
        determine a borehole correction based on at least one of the one or more borehole characteristics;
        accurately determine a formation resistivity surrounding a tool in the wellbore from the borehole characteristics; and
        steer a drill bit based on the determined formation resistivity by indicating when a target formation region has been entered or exited.

20. The borehole characterizing system as recited in claim 19, wherein the processor is configured to determine the one or more borehole characteristic using an iterative inversion process and the one or more orientation components as an input for the iterative inversion process.

21. The borehole characterizing system as recited in claim 19, wherein the one or more of the orientation components are one or more of decoupled multi-components $V^{zz}$ or $V^{xx}$ at one of the two operating frequencies or at both of the two operating frequencies.

* * * * *